United States Patent
Kang

(10) Patent No.: US 12,455,650 B2
(45) Date of Patent: Oct. 28, 2025

(54) DISPLAY DEVICE AND SENSOR DEVICE

(71) Applicant: Samsung Display Co., Ltd., Yongin-Si (KR)

(72) Inventor: Bong Il Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/627,716

(22) Filed: Apr. 5, 2024

(65) Prior Publication Data

US 2025/0077017 A1 Mar. 6, 2025

(30) Foreign Application Priority Data

Sep. 1, 2023 (KR) .......................... 10-2023-0116316

(51) Int. Cl.
    *G06F 3/041* (2006.01)
    *G06F 3/044* (2006.01)

(52) U.S. Cl.
    CPC ........ *G06F 3/04164* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 9,335,881 B2 | 5/2016 | Jeong | |
| 2011/0048812 A1* | 3/2011 | Yilmaz | G06F 3/04164 178/18.06 |
| 2013/0106747 A1* | 5/2013 | Choi | G06F 3/0446 345/173 |
| 2020/0393936 A1* | 12/2020 | Bok | G06F 3/0446 |
| 2021/0132425 A1* | 5/2021 | Bhattacharyya | G02F 1/133514 |

FOREIGN PATENT DOCUMENTS

KR 10-1941255 B1 1/2019

* cited by examiner

*Primary Examiner* — Krishna P Neupane
(74) *Attorney, Agent, or Firm* — Innovation Counsel LLP

(57) ABSTRACT

A display device may include a display panel, a sensor array including first and second sensor electrode groups, first and second signal lines respectively connected to the sensor electrodes of the first and second sensor electrode groups, and a sensor driver connected to the sensor array through the first and second signal lines. The sensor electrodes of the first sensor electrode group may include a first sensor electrode adjacent to an edge of the sensor array, and a second sensor electrode spaced apart from the edge. A signal line connected to the first sensor electrode among the first signal lines may include first and second routing lines connected to first and second ends of the first sensor electrode. A signal line connected to the second sensor electrode among the first signal lines may include a third routing line connected to a first end of the second sensor electrode.

14 Claims, 10 Drawing Sheets

|  | RX1 | RX2 | ... | RX(p-1) | RXp |
|---|---|---|---|---|---|
| TX1 | C11 | C12 |  | C1(p-1) | C1p |
| TX2 | C21 | C22 |  | C2(p-1) | C2p |
| ... |  |  |  |  |  |
| TX(q-1) | C(q-1)1 | C(q-1)2 |  | C(q-1)(p-1) | C(q-1)p |
| TXq | Cq1 | Cq2 |  | Cq(p-1) | Cqp |

DISPLAY DEVICE AND SENSOR DEVICE

CROSS-REFERENCE TO RELATED APPLICATION

The present application claims priority under 35 U.S.C. § 119 to Korean patent application number 10-2023-0116316, filed on Sep. 1, 2023, the entire disclosure of which is incorporated by reference in its entirety herein.

BACKGROUND

Field of Invention

Various embodiments of the present disclosure relate to a display device that may support touch function, and more particularly, a display and a sensor device that may sense touches adjacent to a sensor array.

Description of Related Art

Display devices have become more important as a connection medium between a user and information. Generally, display devices may visually display various types of information, and display devices such as liquid crystal display devices and organic light emitting display devices are commonly used today. Furthermore, modern display devices commonly include not only typical input interfaces such as a button, a keyboard, and a mouse but also a touch screen or a sensor device, which allows a user to easily input information or commands in an intuitive and convenient manner.

The sensor device may be an input device that recognizes a location of a touch from the user to input a user command and may be provided on a front surface of a display panel. The sensor device particularly may determine an input signal by detecting a location of a touch from the hand of the user or an object. Capacitive methods have been used in such sensor devices. However, when the sensor devices include specific types of protective film, significant capacitance differences may occur between a corresponding sensor electrode and surrounding sensor electrodes, thus leading to degradation in the reliability of the operation of the sensor device and/or the display device.

The information disclosed in this background section is only for enhancement of understanding of the background of the described technology and therefore it may contain information that does not form the prior art that is already known to a person of ordinary skill in the art.

SUMMARY

Various embodiments of the present disclosure are directed to a display device capable of sensing touches with improved reliability. For example, the display device may have the same effect as uniformizing capacitance through compensation design of a sensor array, thus making it possible to more accurately sense touch input.

Various embodiments of the present disclosure are directed to a sensor device capable of sensing touches with improved reliability.

An embodiment of the present disclosure may provide a display device, including: a display panel; a sensor array provided to overlap the display panel, and comprising a first sensor electrode group including sensor electrodes extending in a first direction and arranged in a second direction at an angle with the first direction, and a second sensor electrode group including sensor electrodes extending in the second direction and arranged in the first direction; first signal lines electrically connected to the sensor electrodes of the first sensor electrode group; second signal lines electrically connected to the sensor electrodes of the second sensor electrode group; and a sensor driver connected to the sensor array through the first signal lines and the second signal lines to sense a touch adjacent to the sensor array. The sensor electrodes of the first sensor electrode group may include a first sensor electrode adjacent to an edge of the sensor array, and a second sensor electrode spaced apart from the edge of the sensor array with the first sensor electrode interposed therebetween. A signal line connected to the first sensor electrode among the first signal lines may include a first routing line and a second routing line respectively connected to a first end and a second end of the first sensor electrode. A signal line connected to the second sensor electrode among the first signal lines may include a third routing line connected to a first end of the second sensor electrode without a routing line connected to a second end of the second sensor electrode.

The signal line connected to the first sensor electrode may have a capacitance higher than the signal line connected to the second sensor electrode.

The signal line connected to the first sensor electrode may have a resistance value lower than the signal line connected to the second sensor electrode.

The sensor electrodes of the first sensor electrode group may further include a third sensor electrode adjacent to the edge of the sensor array. The second sensor electrode may be disposed between the first sensor electrode and the third sensor electrode. A signal line connected to the third sensor electrode among the first signal lines may include a fourth routing line and a fifth routing line respectively connected to a first end and a second end of the third sensor electrode.

The signal line connected to the first sensor electrode may have a resistance value lower than the signal line connected to the second sensor electrode. The signal line connected to the third sensor electrode has a resistance value lower than the signal line connected to the second sensor electrode.

Each of the first signal lines may include at least one resistor. The at least one resistor of the signal line connected to the first sensor electrode may have a resistance value lower than the at least one resistor of the signal line connected to the second sensor electrode.

The sensor array may further include a plurality of pads connected to the sensor electrodes of the first sensor electrode group through the first signal lines. The first signal lines may include resistors disposed between the sensor electrodes of the first sensor electrode group and the plurality of pads.

A signal line connected to the first sensor electrode among the first signal lines has a first length, and a signal line connected to the second sensor electrode among the first signal lines has a second length. The first length may be less than the second length.

The sensor electrodes of the second sensor electrode group may include a fourth sensor electrode adjacent to the edge of the sensor array, and a fifth sensor electrode spaced apart from the edge of the sensor array with the fourth sensor electrode interposed therebetween. The signal line connected to the fourth sensor electrode may have a capacitance lower than the signal line connected to the fifth sensor electrode.

The sensor electrodes of the second sensor electrode group may include a fourth sensor electrode adjacent to the edge of the sensor array, and a fifth sensor electrode spaced apart from the edge of the sensor array with the fourth sensor electrode interposed therebetween. A signal line connected to the fourth sensor electrode among the second signal lines may have a resistance value higher than a signal line connected to the fifth sensor electrode among the second signal lines.

The sensor electrodes of the second sensor electrode group may further include a sixth sensor electrode adjacent to the edge of the sensor array. The fifth sensor electrode may be disposed between the fourth sensor electrode and the sixth sensor electrode. A signal line connected to the sixth sensor electrode among the second signal lines may have a resistance value higher than the signal line connected to the fifth sensor electrode among the second signal lines.

Signal lines respectively connected to the fourth sensor electrode and the sixth sensor electrode among the second signal lines may extend in a reciprocating manner along the edge of the sensor array.

The display device may further include: a window disposed on the sensor array; and a protective film disposed on the window.

The protective film may include an anti-static coating layer.

An embodiment of the present disclosure may provide a sensor device including: a sensor array provided to overlap a display panel, and comprising a first sensor electrode group including sensor electrodes extending in a first direction and arranged in a second direction at an angle with the first direction, and a second sensor electrode group including sensor electrodes extending in the second direction and arranged in the first direction; first signal lines electrically connected to the sensor electrodes of the first sensor electrode group; second signal lines electrically connected to the sensor electrodes of the second sensor electrode group; and a sensor driver connected to the sensor array through the first signal lines and the second signal lines to sense a touch adjacent to the sensor array. The sensor electrodes of the first sensor electrode group may include a first sensor electrode adjacent to an edge of the sensor array, and a second sensor electrode spaced apart from the edge of the sensor array with the first sensor electrode interposed therebetween. A signal line connected to the first sensor electrode among the first signal lines may include a first routing line and a second routing line respectively connected to a first end and a second end of the first sensor electrode. A signal line connected to the second sensor electrode among the first signal lines may include a third routing line connected to a first end of the sensor electrode without a routing line connected to a second end of the second sensor electrode.

DETAILED DESCRIPTION

Hereinafter, embodiments of the present disclosure will be described in detail with reference to the attached drawings. In the following description, parts required for understanding of operations in accordance with the present disclosure will be described, and explanation of the other parts may be omitted to avoid obscuring the gist of the present disclosure. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

The terminology used herein is for the purpose of describing particular embodiments only and is not intended to be limiting. It will be understood that when an element is referred to as being "coupled" or "connected" to another element, the element can be directly coupled or connected to the other element or indirectly coupled or connected to the other element with intervening elements therebetween. In the specification, an element referred to as "comprising" or "including" a component does not preclude another component, but the element may further include other components unless the context clearly indicates otherwise. The phrases "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Figure 1:
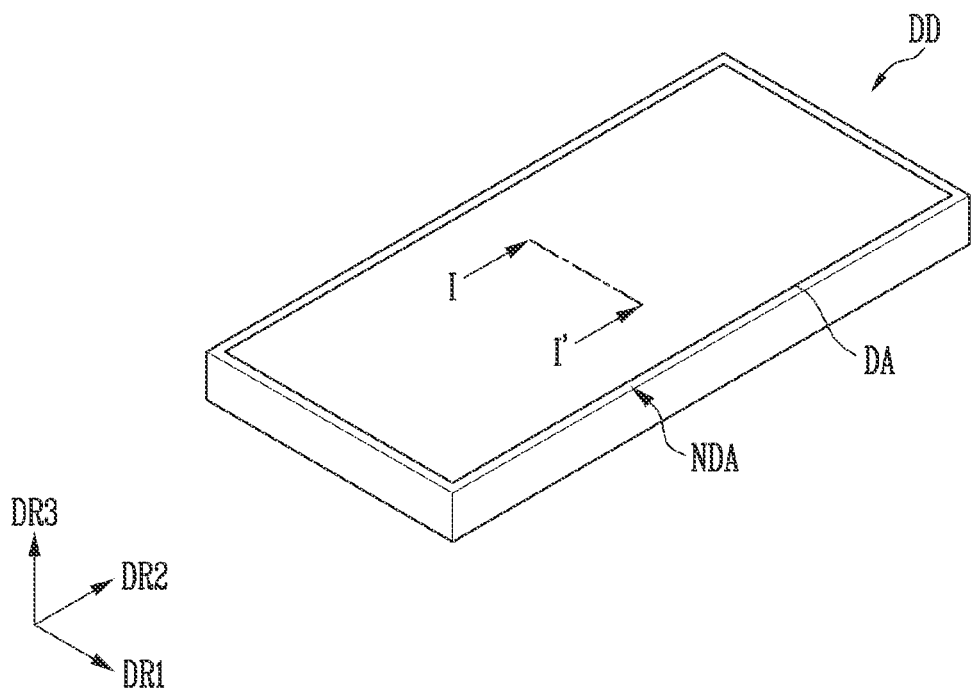
FIG. 1 is a perspective view schematically illustrating a display device in accordance with an embodiment of the present disclosure.

FIG. 1 is a perspective view schematically illustrating a display device DD in accordance with an embodiment of the present disclosure.

Referring to FIG. 1, if the display device DD is an electronic device having a display surface. The display device DD may be, for example, a smartphone, a television, a tablet PC, a mobile phone, a video phone, an electronic reader, a desktop PC, a laptop PC, a netbook computer, a workstation, a server, a PDA, a portable multimedia player (PMP), an MP3 player, a medical appliance, a camera, or a wearable device.

The display device DD may be provided in various forms, for example, in the form of a rectangular plate having two faces or major surfaces and two pairs of parallel sides, but the present disclosure is not limited thereto. In case that the display device DD is provided in the form of a rectangular plate, any one pair of sides of the two pairs of sides may be longer than the other pair of sides. Although FIG. 1 shows the display device DD having an angled or sharp corner where linear or straight sides meet, the present disclosure is not limited thereto. In an embodiment, the display device DD may have the form of a rectangular plate having a rounded shape at a corner where one long side and one short side meet.

In an embodiment of the present disclosure, for the sake of explanation, there is illustrated an example in which the display device DD has a rectangular form with a pair of long sides and a pair of short sides. The direction in which the long sides extend refers to a second direction DR2, the direction in which the short sides extend refers to a first direction DR1, and the direction perpendicular to the long sides and the short sides refers to a third direction DR3.

In an embodiment of the present disclosure, at least a portion of the display device DD may be flexible, and the display device may fold at the flexible portion.

The display device DD may include a display area DA provided to display an image and a non-display area NDA provided on at least one side of the display area DA. The non-display area NDA may be an area on which an image is not displayed. However, the present disclosure is not limited thereto. In an embodiment, the shape of the display area DA and the shape of the non-display area NDA may be varied and related to each other.

Figure 2:
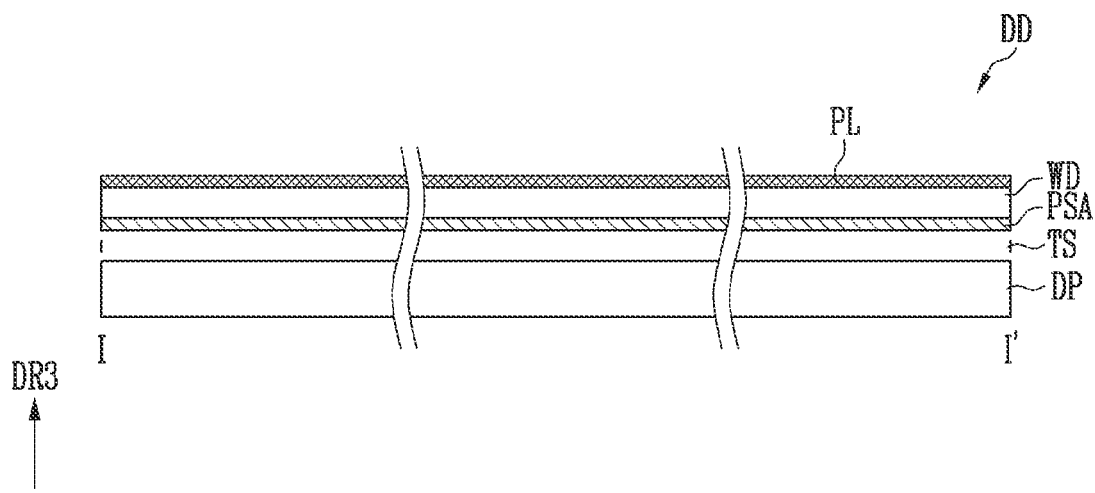
FIG. 2 is a sectional view taken along line I-I' of FIG. 1.

FIG. 2 is a sectional view taken along line I-I' of FIG. 1.

Referring to FIG. 2, the display device DD may include a display panel DP, a touch sensor TS, an adhesive layer PSA, a window WD, and a protective film PL.

The display panel DP may display an image through the display area DA. A self-emissive display panel, such as an organic light emitting display panel (OLED panel) using an organic light emitting diode as a light emitting element, a subminiature light emitting diode (nano-scale LED) display panel using a subminiature LED as a light emitting element, and a quantum dot organic light emitting display panel (QD OLED panel) using a quantum dot and an organic light emitting diode, may be used as the display panel DP. In addition, a non-emissive display panel such as a liquid crystal display (LCD) panel, an electrophoretic display (EPD) panel, or an electrowetting display (EWD) panel may be used as the display panel DP. In case that the non-emissive display panel is used as the display panel DP, the display device DD may include a backlight unit configured to supply light to the display panel DP.

The touch sensor TS (or a touch array 120 shown in FIG. 4) may be directly disposed on an image display surface of the display panel DP and may receive a touch input and/or hover input from the user. Here, "being directly disposed" implies that the display panel DP and the touch sensor TS may be formed through a successive process rather than the touch sensor TS being separately fabricated and then attached to the display panel DP by a separate adhesive layer (or a temporarily adhesive layer). Detailed contents of the touch sensor TS are described below with reference to FIG. 5.

The window WD may be provided on the display panel DP and the touch sensor TS to protect an exposed surface. The touch sensor TS and the window WD may be attached to the adhesive layer PSA.

The adhesive layer PSA may be a pressure-sensitive adhesive film. The adhesive film PSA may be a transparent adhesive layer with high optical transmittance, such as an optically clear adhesive (OCA) film, or optically clear resin (OCR).

The window WD may protect the display panel DP and the touch sensor TS from external impact and provide an input surface and/or a display surface to the user.

The window WD may have a multilayer structure that may include a layer selected from among a glass substrate, a plastic film, and a plastic substrate. The multilayer structure may be formed through a successive process or an adhesion process using an adhesive layer. The window WD may entirely or partially have flexibility.

The protective film PL may be disposed on an upper portion of the window WD to protect the display panel DP and the touch sensor TS. The protective film PL may absorb and/or disperse external impacts to protect the display panel DP. Furthermore, the protective layer PL may prevent external elements such as water and oxygen from penetrating the display device DD or the display panel DP. Detailed contents of the protective film PL are described below with reference to FIG. 3.

Figure 3:
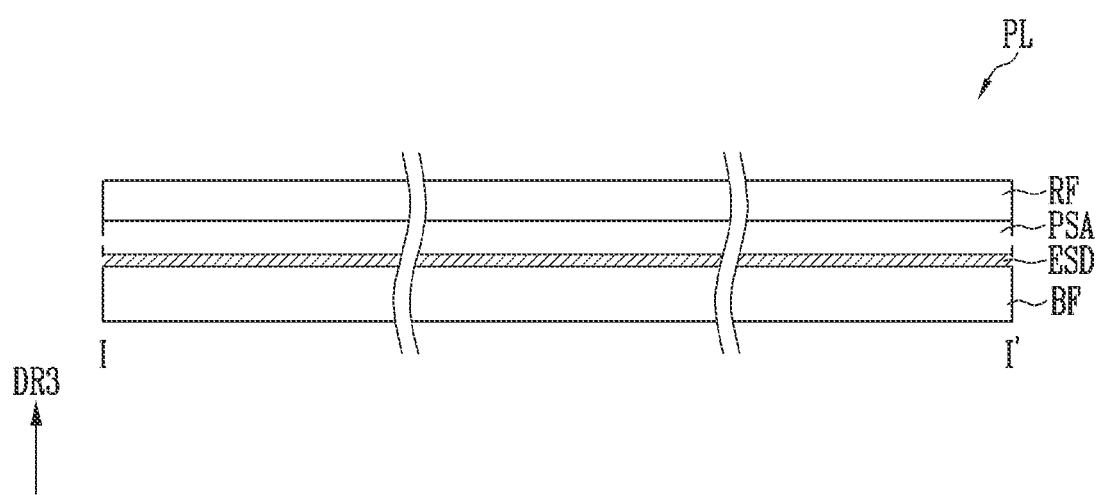
FIG. 3 is a sectional view illustrating an embodiment of a protective film of FIG. 2.

FIG. 3 is a sectional view illustrating an embodiment of the protective film PL of FIG. 2.

Referring to FIG. 3, the protective film PL may include a base film BF, an anti-static coating film ESD, an adhesive layer PSA, and a release film RF.

A base film BF may be a polymer film disposed on the upper portion of the window and may be a polyethylene terephthalate (PET) film or a polyimide film. The base film BF may have high elasticity with excellent flexibility and flatness characteristics, thus making the base film BF suitable for use as a protective film for flexible display devices.

The anti-static coating film ESD may be included between the base film BF and the adhesive layer PSA. The anti-static coating film ESD may be a coating layer including anti-static agent added to one surface of the base film BF. For example, the anti-static agent may be a conductive material. Furthermore, the anti-static agent may be formed of an anti-static composition that includes at least one of metal-based compounds and ionic liquid materials.

The adhesive layer PSA may be an acryl adhesive film used to bond the release film RF to the base film BF, with the anti-static coating film ESD being added to one surface of the base film BF. The release film RF may be provided on the adhesive layer PSA.

Figure 4:
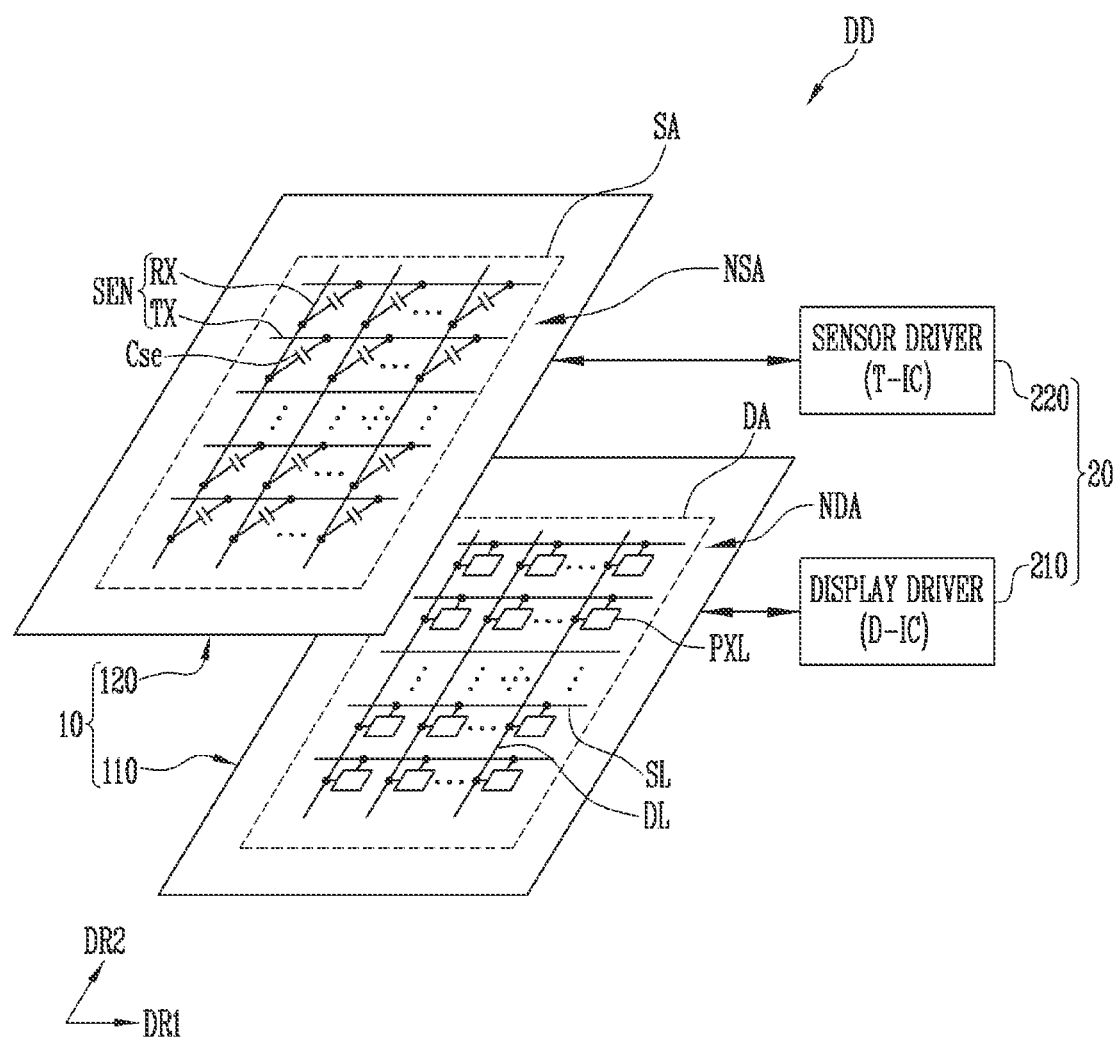
FIG. 4 is a block diagram illustrating an embodiment of the display device of FIG. 1.

FIG. 4 is a block diagram illustrating an embodiment of the display device DD of FIG. 1.

Referring to FIG. 4, the display device DD may include a panel 10, and a driver 20 to drive the panel 10. The panel 10 may include a display panel 110 to display an image, and a sensor array 120 to sense touch input. The driver 20 may include a display driver 210 to drive the display panel 110 and a sensor driver 220 to drive the sensor array 120. The sensor array 120 and the sensor driver 220 of the display device DD may form a sensor device.

In an embodiment, the display panel 110 and the sensor array 120 may be separately fabricated and may then be positioned and/or connected with each other such that at least respective portions the display panel 110 and the sensor array 120 overlap each other. Alternatively, the display panel 110 and the sensor array 120 may be integrally fabricated. For example, the sensor array 120 may be directly formed on at least one of a substrate, e.g., an upper and/or lower substrate of the display panel, a thin film encapsulation (TFE) layer, of the display panel 110, or other insulating layers or functional layers such as an optical layer or a passivation layer of the display panel 110.

The display panel 110 may include a plurality of pixels PXL. The pixels PXL may be disposed in the display area DA of the display panel 110.

The display panel 110 may include the display area DA and the non-display area NDA. The display area DA is where an image may be displayed, and the non-display area NDA may be provided around the periphery of the display area DA. For example, the display area DA may be disposed in a central area of the display panel 110, and the non-display area NDA may be disposed in an edge area of the display panel 110 in such a way as to surround the display area DA.

The pixels PXL may connect to the scan lines SL and the data lines DL in the display area DA. The pixels PXL may be selected by scan signals supplied from the scan lines SL, may be supplied with data signals from the data lines DL, and may emit light having luminance corresponding to the data signals. As a result, the display panel 110 may display in the display area DA an image corresponding to the data signals. Each of the pixels PXL may be implemented using a pixel circuit or architecture that can employ various known structures and/or driving methods.

Various lines and/or internal circuits which are connected to the pixels PXL in the display area DA may be disposed in the non-display area NDA. For example, a plurality of lines for supplying various driving power and driving signals to the display area DA may be disposed or may originate in the non-display area NDA. In addition, a pad area or the like may also be disposed in the non-display area NDA of the display panel 110.

The sensor array 120 may include a plurality of electrodes. The electrodes may be disposed in a sensing area SA.

The sensor array 120 may include the sensing area SA and a peripheral area NSA. The sensing area SA is an area in which touch input may be sensed, and the peripheral area NSA encloses the sensing area SA. The sensing area SA may be disposed to overlap at least one area of the display area DA. For example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In this case, when a touch input is provided on the display area DA, the sensor array 120 may be used to detect the touch input.

In an embodiment, sensor electrodes SEN in the sensing area SA may include sensing electrode RX(or a first sensor electrode group) and driving electrodes TX(or a second sensor electrode group). A mutual capacitive touch sensor may be implemented using the driving electrodes TX and the sensing electrodes RX. For example, mutual capacitances Cse may be formed between the driving electrodes TX and the sensing electrodes RX. The mutual capacitances Cse in an area of a touch input may change based on the touch input. The touch input may then be detected by sensing the changes in the mutual capacitances Cse.

In the peripheral area NSA of the sensor array 120, signal lines may be disposed to electrically connect the sensor electrodes SEN to the sensor driver 220 or the like. For example, a plurality of signal lines connected to the respective driving electrodes TX and sensing electrodes RX may be disposed in the peripheral area NSA.

The display driver 210 may be electrically connected to the display panel 110 and thus may drive the pixels PXL. To drive the pixels PXL, the display driver 210 may include a scan driver to supply scan signals to the scan lines SL, a data driver to supply data signals to the data lines DL, and a timing controller to control the scan driver and the data driver. For example, the scan driver, the data driver, and/or the timing controller may be integrated in a single display IC (D-IC), but the present disclosure is not limited thereto.

The sensor driver 220 may be electrically connected to the sensor array 120 and may drive the sensing electrodes SEN. The sensor driver 220 may supply touch driving signals to the driving electrodes TX during a period in which the touch sensors are enabled (e.g., a touch sensing period) and may receive sensing signals corresponding to the touch driving signals from the sensing electrodes RX. For the aforementioned operation, the sensor driver 220 may include a touch driving circuit and a touch sensing circuit. The touch driving circuit and the touch sensing circuit may be integrated in a single touch IC (T-IC), but the present disclosure is not limited thereto.

The display driver 210 and the sensor driver 220 may be configured separately from each other, or at least portions the display driver 210 and the sensor driver 220 may be integrated in a single driving IC (driver IC).

The display device DD may include the sensor device for convenience of use of the display device DD. For example, the user can easily control the display device DD by touching a screen in the sensing area SA of the sensor array 120 while viewing images displayed on the screen in the display area DA of the display panel 110.

Figure 5:
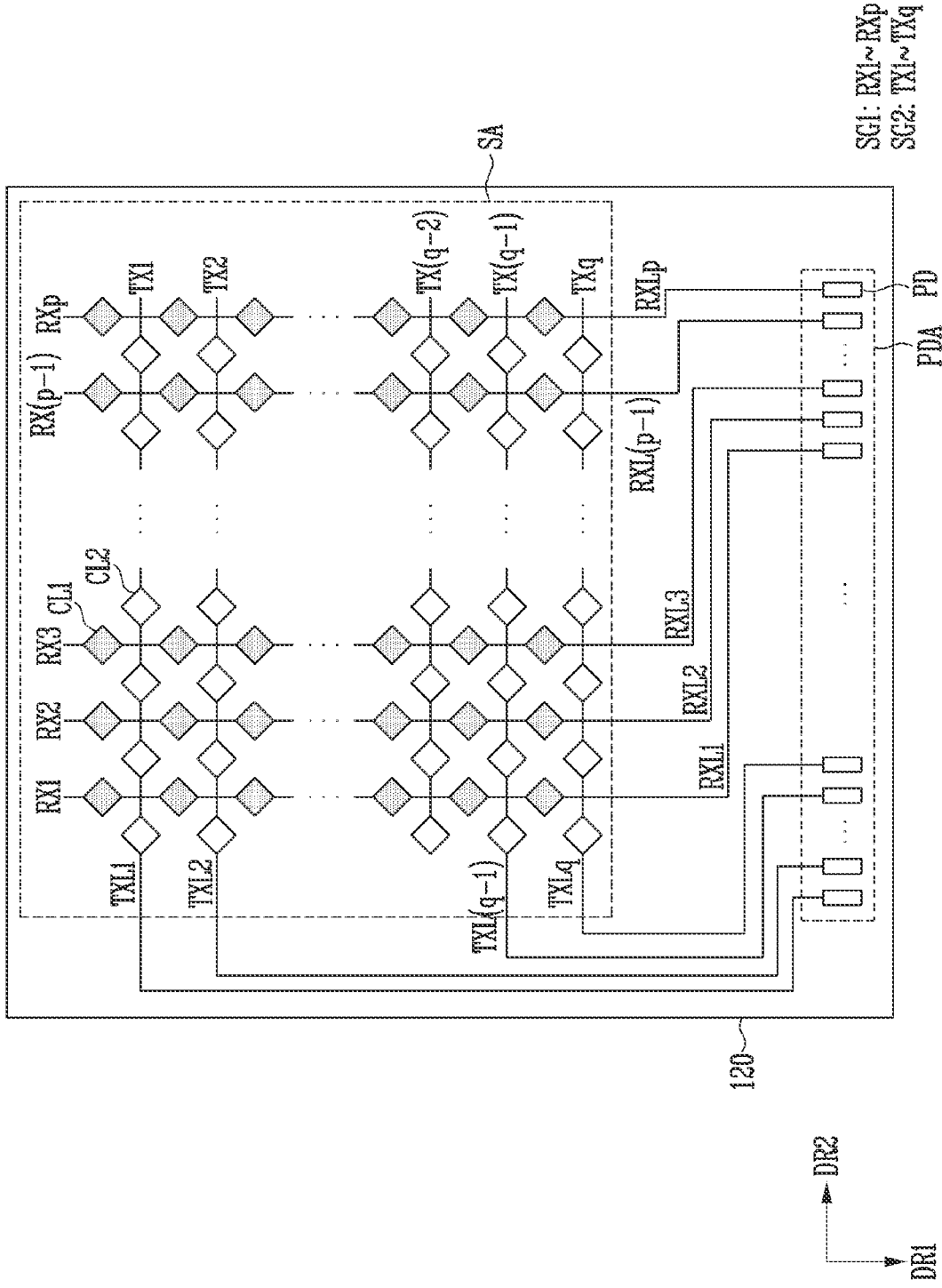
FIG. 5 is a diagram illustrating an embodiment of a sensor array of FIG. 4.

FIG. 5 is a diagram illustrating an embodiment of the sensor array 120 of FIG. 4.

Referring to FIG. 5, the sensor array 120 may be disposed on a surface of the display panel DP on which an image is displayed and may be configured to receive touch input from the user.

In an embodiment, the sensor array 120 may use various techniques to sense touch input. The sensor array 120 may sense a touch from use in a self-capacitance manner or a mutual capacitance manner.

The sensing area SA of the sensor array 120 may have a shape that is substantially the same as the shape of the display area DA.

As illustrated in FIG. 5, the sensor array 120 may include a plurality of sensor electrodes in the sensing area SA. For example, the sensor array 120 may include a first sensor electrode group SG1 including sensor electrodes that extend in the first direction DR1 and are arranged in the second direction DR2, which is at an angle with the first direction DR1. Hereinafter, the sensor electrodes of the first sensor electrode group SG1 may refer to first to p-th sensing electrodes RX1 to RXp. The sensor array 120 may include a second sensor electrode group SG2 including sensor electrodes that extend in the second direction DR2 and are arranged in the first direction DR1. Hereinafter, the sensor electrodes of the second sensor electrode group SG2 may refer to first to q-th driving electrodes TX1 to TXq.

In an embodiment, the sensor electrodes of the first sensor electrode group SG1 may include the first sensing electrode RX1 and the p-th sensing electrode RXp that are adjacent to an edge of the sensor array 120, and the remaining second to p−1-th sensing electrodes RX2 to RX(p−1). The second to p−1-th sensing electrodes RX2 to RX(p−1) may be disposed between the first sensing electrode RX1 and the p-th sensing electrode RXp.

In an embodiment, the sensor electrodes of the second sensor electrode group SG2 may include the first driving electrode TX1 and the q-th driving electrode TXq that are adjacent to the edge of the sensor array 120, and the remaining second to q−1-th driving electrodes TX2 to TX(q−1). The second to q−1-th driving electrodes TX2 to TX(q−1) may be disposed between the first driving electrode TX1 and the q-th driving electrode TXq.

The first to p-th sensing electrodes RX1 to RXp (or the sensor electrodes of the first sensor electrode group) may be respectively connected to first to p-th sensing lines RXL1 to RXLp (or first signal lines). The first to q-th driving electrodes TX1 to TXq (or the sensor electrodes of the second sensor electrode group) may be respectively connected to first to q-th driving lines TXL1 to TXLq (or second signal lines). In this case, the first to p-th second electrodes RX1 to RXp may be provided as the sensing electrodes RX of FIG. 4. The first to q-th driving electrodes TX1 to TXq may be provided as the driving electrodes TX of FIG. 4.

Each of the first to p-th sensing electrodes RX1 to RXp may include first cells CL1 that are arranged in or along the first direction DR1 and are electrically connected to each other. Each of the first to q-th driving electrodes TX1 to TXq may include second cells CL2 that are arranged in or along the second direction DR2 and are electrically connected to each other. In FIG. 5, each of the first cells CL1 and the second cells CL2 is illustrated as having a diamond shape. Here, the diamond shape is only illustrative, and at least one of various shapes such as circular, rectangular, triangular, and mesh, may be used. Furthermore, each of the first cells CL1 and the second cells CL2 may be formed as a single layer or multiple layers. As such, the shapes and the arrangements of the first to q-th driving electrodes TX1 to TXq and the first to p-th sensing electrodes RX1 to RXp may be modified in various ways.

In an embodiment, the first cells CL1 and the second cells CL2 may include at least one of various conductive materials such as metallic materials, transparent materials, and the like, thus ensuring conductivity. For example, the first cells CL1 and the second cells CL2 may include at least one of various metals such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof.

The sensor array 120 of FIG. 5 may be provided as the sensor array 120 of the display device DD shown in FIG. 4.

At least one or more first to q-th driving lines TXL1 to TXLq, at least one or more first to p-th sensing lines RXL1 to RXLp, and a pad area PDA may be in the peripheral area NSA. At least one or more pads PD may be disposed in the pad area PDA to electrically connect the sensor electrodes SEN of the sensor array 120 to the sensor driver 220.

The sensor array 120 may include some of the pads PD connected to the first to q-th driving lines TXL1 to TXLq. The pads PD may be connected to the first to q-th driving electrodes TX1 to TXq through the first to q-th driving lines TXL1 to TXLq. For example, respective first ends of the first to q-th driving lines TXL1 to TXLq may be connected to respective first ends of the first to q-th driving electrodes TX1 to TXq. Respective second ends of the first to q-th driving lines TXL1 to TXLq may be connected to some of the pads PD. The first to q-th driving lines TXL1 to TXLq may function to connect the first to q-th driving electrodes TX1 to TXq to the pads PD.

The sensor array 120 may further include remaining ones of the pads PD connected to the first to p-th sensing lines RXL1 to RXLp. The pads PD may be connected to the first to p-th sensing electrodes RX1 to RXp through the first to p-th sensing lines RXL1 to RXLp. For example, respective first ends of the first to p-th sensing lines RXL1 to RXLp may be connected to respective first ends of the first to p-th sensing electrodes RX1 to RXp. Respective second ends of the first to p-th sensing lines RXL1 to RXLp may be connected to some of the pads PD. In other words, the first to p-th sensing lines RXL1 to RXLp may function to connect the first to p-th sensing electrodes RX1 to RXp to the pads PD.

The first to q-th driving lines TXL1 to TXLq and the first to p-th sensing lines RXL1 to RXLp may be electrically connected to a driving circuit IC through the pads PD.

The sensor electrodes SEN and the signal lines connected to the sensor electrodes SEN may have a single-layer or multilayer structure. The sensor electrodes SEN and the signal lines connected to the sensor electrodes SEN may include indium tin oxide (ITO), indium zinc oxide (IZO), zinc oxide (ZnO), indium tin zinc oxide (ITZO), PEDOT, metal nanowires, and/or graphene.

Figures 6, 7:
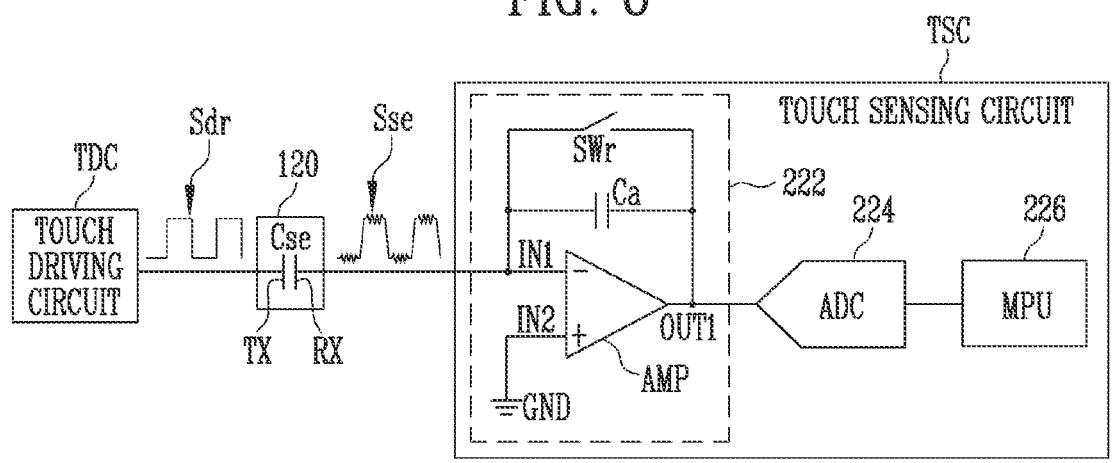
FIG. 6 is a block diagram illustrating an embodiment of a sensor driver of FIG. 4.
FIG. 7 is a table showing an example of non-uniform capacitances formed on the sensor array of FIG. 5.

FIG. 6 is a block diagram illustrating an embodiment of the sensor driver 220 of FIG. 4 connected to a driving electrode TX and a sensing electrode RX.

Referring to FIGS. 4 and 6, the sensor array 120 may include the driving electrodes TX(or the sensor electrodes of the second sensor electrode group) and the sensing electrodes RX(or the sensor electrodes of the first sensor electrode group) that form capacitances Cse. The driving electrodes TX and the sensing electrodes RX may be respectively connected to a touch driving circuit TDC and a touch sensing circuit TSC. Here, the touch driving circuit TDC and the touch sensing circuit TSC may be included in the sensor driver 220.

With regard to a method of driving the sensor device, during a touch sensing period in which a touch sensing mode is activated, the touch driving circuit TDC supplies a touch driving signal Sdr to each of the driving electrodes TX. Here, the touch driving signal Sdr may be an alternating current signal with a specific cycle, such as a pulse wave.

As illustrated in FIG. 5, in the case where the sensor array 120 includes driving electrodes TX, the touch driving circuit TDC may sequentially supply touch driving signals Sdr to the driving electrodes TX during a certain touch sensing period. In this case, due to the capacitances Cse formed by the respective driving electrodes TX with the sensing electrodes RX provided adjacent thereto, sensing signals Sse corresponding to the touch driving signals Sdr applied to the driving electrodes TX may be output through the sensing electrodes RX. The sensing signals Sse may be input to the touch sensing circuit TSC and used to detect touch input.

In the case where the sensor array 120 includes the sensing electrodes RX, the touch sensing circuit TSC may include a plurality of sensing channels (or receiving channels) 222 that are electrically connected to the respective sensing electrodes RX. The touch sensing circuit TSC may receive the sensing signals Sse from the respective sensing electrodes RX through the sensing channels 222 and detect the touch input by combining the received sensing signals Sse.

Each of the sensing electrodes RX, along with an amplifier AMP {or an analog front end (AFE) circuit provided with the amplifier AMP} connected to the corresponding sensing electrode RX, may form each sensing channel 222.

In an embodiment, the touch sensing circuit TSC may amplify, translate, and process the sensing signal Sse input from each of the sensing electrodes RX and based on the results, detect touch input. Here, the touch sensing circuit TSC may include sensing channels 222 respectively corresponding to the sensing electrodes RX, and an analog-to-digital converter (ADC) 224 and a processor 226 that are connected to the sensing channels 222.

Each sensing channel 222 may be formed of an analog front-end circuit to receive a sensing signal Sse from the corresponding sensing electrode RX. For example, each of the sensing channels 222 may be implemented as an analog front-end circuit including at least one amplifier AMP.

Each of the sensing channels 222 may include a first input terminal IN1 (e.g., an inverting input terminal of the amplifier AMP), and a second input terminal IN2 (e.g., a non-inverting input terminal of the amplifier AMP). The sensor channel 222 may generate an output signal OUT1 corresponding to a difference in voltage between the first input terminal IN1 and the second input terminal IN2. Each of the sensor channels 222 may amplify a differential voltage between the first input terminal IN1 and the second input terminal IN2 by a degree corresponding to a certain gain and output the amplified voltage as the output signal OUT1.

In the case where the sensing electrodes RX and the sensing channels 222 corresponding thereto are provided, the first input terminal IN1 of each of the sensing channels 222 may be connected to different sensing electrodes RX among the sensing electrodes RX. The sensing electrodes RX and the sensing channels 222 may be connected in a one-to-one correspondence. In this case, a sensing signal Sse may be input from any one of the sensing electrodes RX to the first input terminal IN1 of the sensing channel 222 that corresponds to that sensing electrode RX.

The second input terminal IN2 of each of the sensing channels 222 may be a reference potential terminal. The second input terminal IN2 may be connected to a reference voltage source such as a ground power supply GND. Hence, the sensing channels 222 may amplify the sensing signal Sse input to the first input terminal IN1, based on the potential of the second input terminal IN2, and output the amplified sensing signal OUT1. In other words, each of the sensing channels 222 may receive a sensing signal Sse from the corresponding sensing electrode RX through the first input terminal IN1 and may amplify the sensing signal Sse by amplifying the signal corresponding to a voltage difference between the voltage at the first input terminal IN1 and the voltage at the second input terminal IN2.

The analog-to-digital converter 224 may convert an analog signal input from each of the sensing channels 222 to a digital signal. Analog-to-digital converters 224 may be provided in a one-to-one correspondence with the number of sensing electrodes RX to correspond to the sensing channels 222 associated with the respective sensing electrodes RX. However, the present disclosure is not limited to the aforementioned example.

The processor 226 may detect touch input using sensing signals Sse output from the respective sensing electrodes RX or more particularly the amplified and digitized signals as described above. The processor 226 may process signals input from the respective sensing electrodes RX via the corresponding sensing channels 222 and the corresponding analog-to-digital converter 224 and may analyze the sensing signals Sse to detect whether touch input has occurred and identify a location of the touch input.

The processor 226 may be implemented as a microprocessor (MPU). Furthermore, an additional memory needed to drive the processor 226 may be provided in the touch sensing circuit TSC. However, the configuration of the processor 226 is not limited to the aforementioned example.

FIG. 7 shows a table illustrating an example of non-uniform capacitances formed on the sensor array of FIG. 5.

Referring to FIGS. 4 and 7, a capacitance may be formed between each of the driving electrodes TX and each of the sensing electrodes RX in the sensor array 120. The first to p-th sensing electrodes RX1 to RXp may cross the first to q-th driving electrodes TX1 to TXq but be electrically separated from the first to q-th driving electrodes TX1 to TXq. The first to p-th electrodes RX1 to RXp thus form mutual capacitances C11 to Cqp with the first to q-th driving electrodes TX1 to TXq as shown in FIG. 7.

Generally, in the sensor array 120, a capacitance of one sensor electrode may have a value similar to that of surrounding sensor electrodes. However, deviations may occur between the capacitances of the sensor electrodes that are disposed in the edge of the sensor array 120 and those of the sensor electrodes away from the edge of the sensor array 120. Particularly, in the case where a specific type of protective film is used, the deviations between the capacitances of the sensor electrodes that are disposed in the edge of the sensor array 120 and those of the other sensor electrodes may increase relatively.

As described above with reference to FIG. 3, a specific type of protective film that causes differences in capacitances may be a protective film placed on the window disposed on the sensor array 120 and may be a protective film including an anti-static coating layer on one surface of the base film BF. For example, a specific type of protective film may be a protective film in which an anti-static coating layer is applied to one surface of the base film BF in the case where an adhesive formed of acrylic resin is applied to the base film BF formed of polyester (PET). However, embodiments are not limited to the aforementioned example.

The embodiments of the present disclosure may be applicable to protective films that cause variations in capacitances of the sensor electrodes adjacent to the edge of the sensor array 120 and capacitances of the surrounding sensor electrodes.

In the case where a specific type of protective film is used, capacitances formed on each of the first to p-th sensing electrodes RX1 to RXp may be different from capacitances formed on the second to p-1-th sensing electrodes RX2 to Rx(p-1). For example, the capacitances formed on the first and p-th sensing electrodes RX1 and RXp may be higher than the capacitances formed on the second to p-1-th sensing electrodes RX2 to RX(p-1). In detail, capacitances C11 to Cq1 formed on the first sensing electrode RX1 may have an average value of approximately 453 fF, and capacitances C12 to Cq2 formed on the second sensing electrode RX2 may have an average value of approximately 420 fF. Furthermore, capacitances C1$p$ to Cqp formed on the p-th sensing electrode RXp may have an average value of approximately 490 fF, and capacitances C1(p-1) to Cq(p-1) formed on the p-1-th sensing electrode RX(p-1) may have an average value of approximately 448 fF.

In the case where a specific type of protective film is used, capacitances formed on each of the first and q-th driving electrodes TX1 and TXq may be different from capacitances formed on the second to q-1-th driving electrodes TX2 to Tx(q-1). For example, the capacitances formed on the first and q-th driving electrodes TX1 and TXq may be lower than the capacitances formed on the second to q-1-th driving electrodes TX2 to TX(q-1). In detail, capacitances C11 to C1$p$ formed on the first driving electrode TX1 may have an average value of approximately 445 F, and capacitances C21 to C2$p$ formed on the second driving electrode TX2 may have an average value of approximately 550 F. Furthermore, capacitances Cq1 to Cqp formed on the q-th driving electrode TXq may have an average value of approximately 221 F, and capacitances C(q-1)1 to C(q-1)p formed on the q-1-th driving electrode TX(q-1) may have an average value of approximately 327 F.

As such, in the case where a specific type of protective film is used, capacitances may be formed more unevenly on the sensor electrodes adjacent to the edge of the sensor array 120 and surrounding sensors thereof. Such capacitances formed unevenly may lead to malfunctions in determining touch input. Considering the above-mentioned problems, to prevent the sensor device and/or the display device from malfunctioning and to allow the sensor device to more accurately detect touch input, the signal lines in the sensor array 120 may be laid out to improve uniformity of the capacitances.

Figure 8:
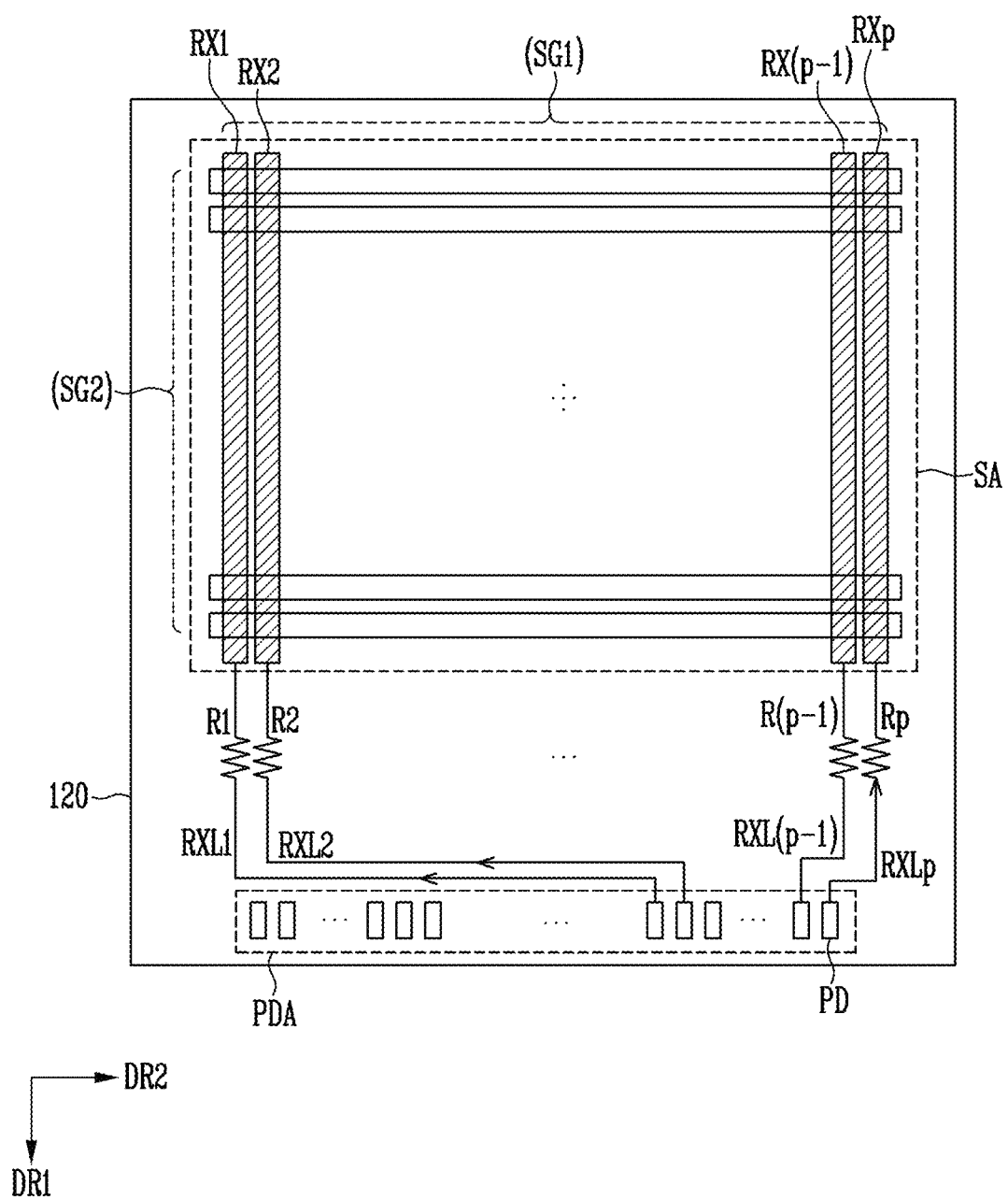
FIG. 8 is a block diagram illustrating resistors on signal lines connected to sensor electrodes of a first sensor electrode group.

FIG. 8 is a block diagram illustrating resistors or resistances on signal lines connected to sensor electrodes of the first sensor electrode group SG1.

Referring to FIG. 8, the sensor array 120 may include sensor electrodes (hereinafter, referred to as sensing electrodes) RX1 to RXp of the first sensor electrode group SG1 and first signal lines (hereinafter, referred to as sensing lines) RXL1 to RXLp. The sensor array 120 may include a plurality of pads PD that are electrically connected to the sensing electrodes RX1 to RXp of the first sensor electrode group SG1 through the first sensing lines RXL1 to RXLp.

The sensor array 120 may include sensor electrodes (hereinafter, referred to as driving electrodes) of the second sensor electrode group SG2 and second signal lines (hereinafter, referred to as driving lines).

In an embodiment, the first sensor electrode group SG1 may include the first to p-th sensing electrodes RX1 to RXp that extend in the first direction DR1 and are arranged in the second direction DR2 at an angle with the first direction DR1.

Each of the first to p-th sensing lines RXL1 to RXLp, which are electrically connected to the first to p-th sensing electrodes RX1 to RXp, may include at least one resistor. Resistors R1 to Rp respectively provided on the first to p-th sensing lines RXL1 to RXLp may be disposed between the first to p-th sensing electrodes RX1 to RXp and the plurality of pads PD. The first to p-th resistors R1 to Rp may be separate structures respectively added to the first to p-th sensing lines RXL1 to RXLp or may be the resistances inherent in the conductive structure of the first to p-th sensing lines RXL1 to RXLp.

The first sensing line RXL1 connected to the first sensing electrode RX1 may include a resistor R1. The second sensing line RXL2 connected to the second sensing electrode RX2 may include a resistor R2. In the case where a specific type of protective film is used, capacitances formed on the first sensing electrode RX1 adjacent to the edge of the sensor array 120 may be relatively high compared to capacitances formed by other sensing electrodes in the first sensor electrode group SG1, e.g., compared to capacitances formed on the second to p−1-th sensing electrodes RX2 to RX(p−1). Taking this into account, in accordance with embodiments of the present disclosure, the resistor R1 of the first sensing line RXL1 may have a lower resistance value than does the resistor R2 of the second sensing line RXL2.

Furthermore, capacitances formed on the p-th sensing electrode RXp, which adjacent to the edge of the sensor array 120 on a side opposite to the first sensing electrode RX1, may be relatively high compared to capacitances formed on the second to p−1-th sensing electrodes RX2 to RX(p−1). Taking this into account, in accordance with an embodiment of the present disclosure, the resistor Rp of the p-th sensing line RXLp may have a lower resistance value than does the resistor R(p−1) of the p−1-th sensing line RXL(p−1).

In an embodiment, the resistors R1 to Rp included in the first to p-th sensing lines RXL1 to RXLp may be set according to ratio differences of the capacitances formed on the first to p-th sensing electrodes RX1 to RXp of the first sensor electrode group SG1. For example, relatively high capacitances may be formed on the first sensing electrode RX1 and the p-th sensing electrodes RXp, compared to capacitances formed on the remaining second to p−1-th sensing electrodes RX2 to RX(p−1). Relatively high capacitances may reduce the sensitivity of touch sensed through the first sensing electrode RX1 and the p-th sensing electrode RXp to a value lower than those of the other sensing electrodes RX2 to RX(p−1). To compensate for this, the resistor R1 of the first sensing line RXL1 and the resistor Rp of the p-th sensing line RXLp may be set to have resistance values lower than the resistance values of the resistors R2 to R(p−1) of the second to p−1-th sensing lines RXL2 to RXL(p−1). In other words, each resistance value may be set based on ratio differences of the capacitances. On the other hand, since the capacitances formed on the remaining second to p−1-th sensing electrodes RX2 to RX(p−1) are similar to each other, the resistors R2 to R(p−1) of the second to p−1-th sensing lines RXL2 to RXL(p−1) may be set to the same resistance value.

The ratio difference of capacitances used to set the resistance value for the resistor R1 of the first sensing line RXL1 may be computed based on the ratio of capacitances formed on the first sensing electrode RX1 for the case where a specific type of protective film is not used and the case where a specific type of protective film is used. Here, the value of the capacitance formed on the first sensing electrode RX1 may be applied to the value in the case where a specific type of protective film is not used. In addition, a difference value between the capacitances formed on the first sensing electrode RX1 and the second sensing electrode RX2 may be applied to the value in the case where a specific type of protective film is used.

The resistors of the sensing lines may be implemented or provided using variable resistors or fixed resistors. In either case, the resistance values may be optimized or adjusted depending on the computed ratio differences of the capacitances. As such, the deviations in capacitance between the sensing electrodes may be compensated for through the resistors of the sensing lines that are set according to differences in capacitance.

Figure 9:
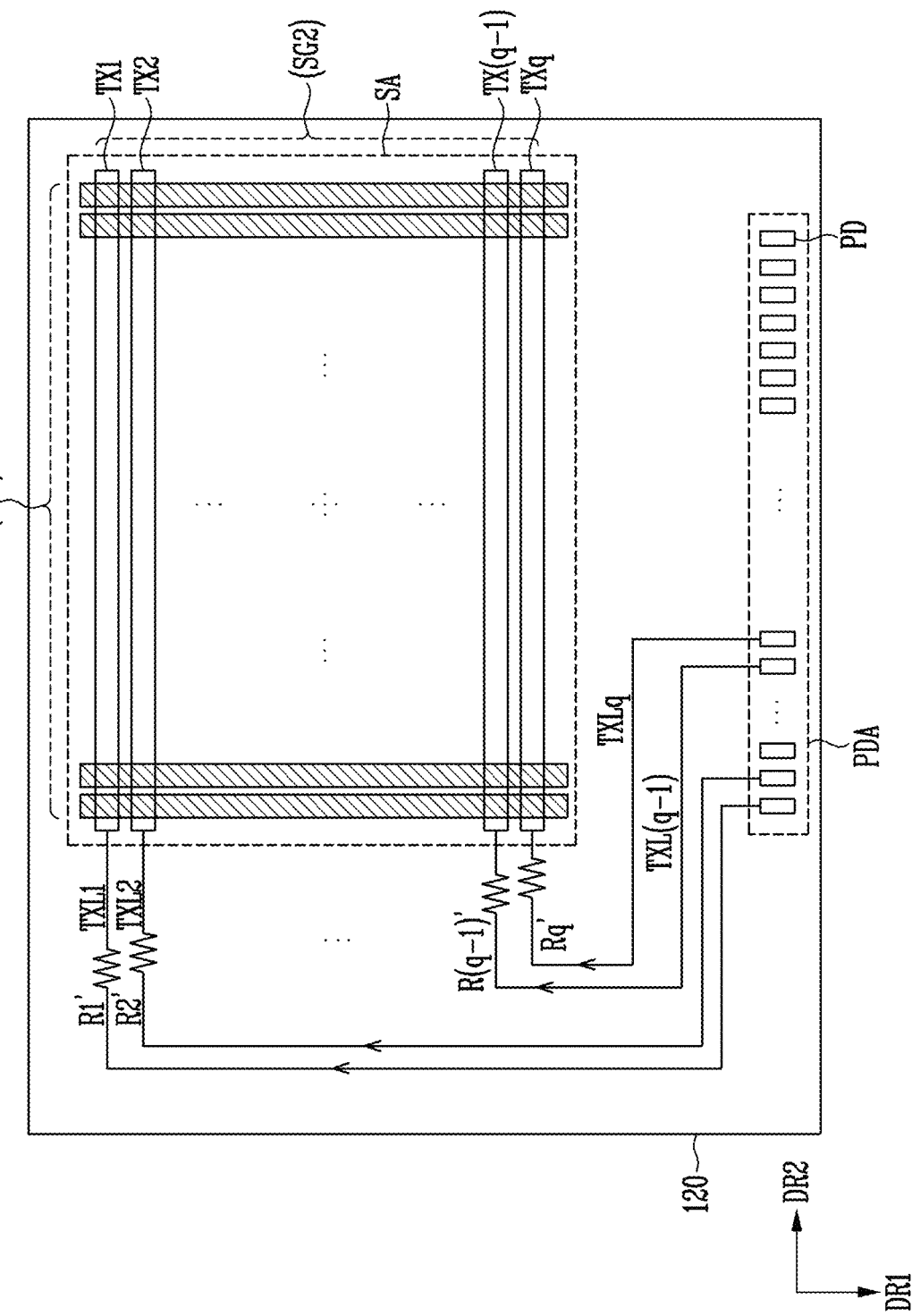
FIG. 9 is a block diagram illustrating resistors on signal lines connected to sensor electrodes of a second sensor electrode group.

FIG. 9 is a block diagram showing resistors on signal lines connected to sensor electrodes of the second sensor electrode group SG2.

Referring to FIG. 9, the sensor array 120 may include a plurality of pads PD that are electrically connected to the sensor electrodes of the second sensor electrode group SG2 through the second signal lines.

In an embodiment, the second sensor electrode group SG2 may include first to q-th driving electrodes TX1 to TXq that extend in the second direction DR2 and are arranged along the first direction DR1. The signal lines include the first to q-th driving lines TXL1 to TXLq. The first to q-th driving lines TXL1 to TXLq are electrically connected to the first to q-th driving electrodes TX1 to TXq of the second sensor electrode group SG2, and each of the first to q-th driving lines TXL1 to TXLq may include at least one of resistors R1' to Rq'. The resistors R1' to Rq' respectively included in the first to q-th driving lines TXL1 to TXLq may be disposed between the first to q-th driving electrodes TX1 to TXq of the second sensor electrode group SG2 and the plurality of pads PD. The resistors R1' to Rq' may be separate structures respectively added to the first to q-th driving lines TXL1 to TXLq or may be the resistances inherent in the conductive structure of the first to q-th driving lines TXL1 to TXLq.

The first driving line TXL1 connected to the first driving electrode TX1 may include the resistor R1'. The second driving line TXL2 connected to the second driving electrode TX2 may include the resistor R2'. In the case where a specific type of protective film is used, capacitances formed on the first driving electrode TX1 adjacent to the edge of the sensor array 120 may be relatively low compared to capacitances formed on the second to q−1-th driving electrodes TX2 to TX(q−1). Taking this into account, in accordance with embodiments of the present disclosure, the resistor R1' of the first driving line TXL1 may have a higher resistance value than the resistor R2' of the second driving line TXL2.

Capacitances formed on the q-th driving electrode TXq adjacent to the edge of the sensor array 120 on a side of the second sensor electrode group SG2 opposite to the first driving electrode TX1 may be relatively low compared to capacitances formed on the second to q−1-th driving electrodes TX2 to TX(q−1). Taking this into account, in accordance with an embodiment of the present disclosure, the resistor Rq' of the q-th driving line TXLq may have a higher resistance value than the resistor R(q−1)' of the q−1-th driving line TXL(q−1).

In an embodiment, the resistors R1' to Rq' included in the first to q-th driving lines TXL1 to TXLq may be set according to ratio differences of the capacitances formed on the first to q-th driving electrodes TX1 to TXq of the second sensor electrode group SG2. For example, capacitances formed on the first and q-th driving electrodes TX1 and TXq may be relatively low compared to capacitances formed on the second to q−1-th driving electrodes TX2 to TX(q−1). To compensate for this, the resistor R1' of the first driving line TXL1 and the resistor Rq' of the q-th driving line TXLq may be set to have resistance values higher than the resistors R2' to R(q−1)' of the second to q−1-th driving lines TXL2 to TXL(q−1). In other words, each resistance value may be set based on ratio differences of the capacitances. On the other hand, since the capacitances formed on the remaining second to q−1-th driving electrodes TX2 to TX(q−1) are similar to each other, the resistors R2' to R(q−1)' of the second to q−1-th driving lines TXL2 to TXL(q−1) may be set to the same resistance value.

The ratio of capacitances used to set the resistance value for the resistor R1' of the first driving line TXL1 can be computed based on the ratio of capacitances formed on the first driving electrode TX1 for the case where a specific type of protective film is not used and the case where a specific type of protective film is used. Here, the value of the capacitance formed on the first driving electrode TX1 may be applied to the value in the case where a specific type of protective film is not used. Furthermore, in the case where a specific type of protective film is used, a difference value between the capacitances formed on the first driving electrode TX1 and the second driving electrode TX2 may be used.

In detail, a ratio difference in capacitance between the first driving electrode TX1 and the second driving electrode TX2 may be approximately 3.4%. A ratio difference in capacitance between the q-th driving electrode TXq and the q−1-th driving electrode TX(q−1) may be approximately 3.7%. In this case, based on the computed ratio difference in capacitance, the resistor R1' of the first driving line TXL1 may be set to a resistance value higher by approximately 3.4% than the resistor R2' of the second driving line TXL2. The resistor Rq' of the q-th driving line TXLq may be set to a resistance value higher by approximately 3.7% than the resistor R(q−1)' of the q−1-th driving line TXL(q−1).

The deviations in capacitance between the driving electrodes may be compensated for through the resistors of the driving lines that are set according to differences in capacitance.

Figure 10:
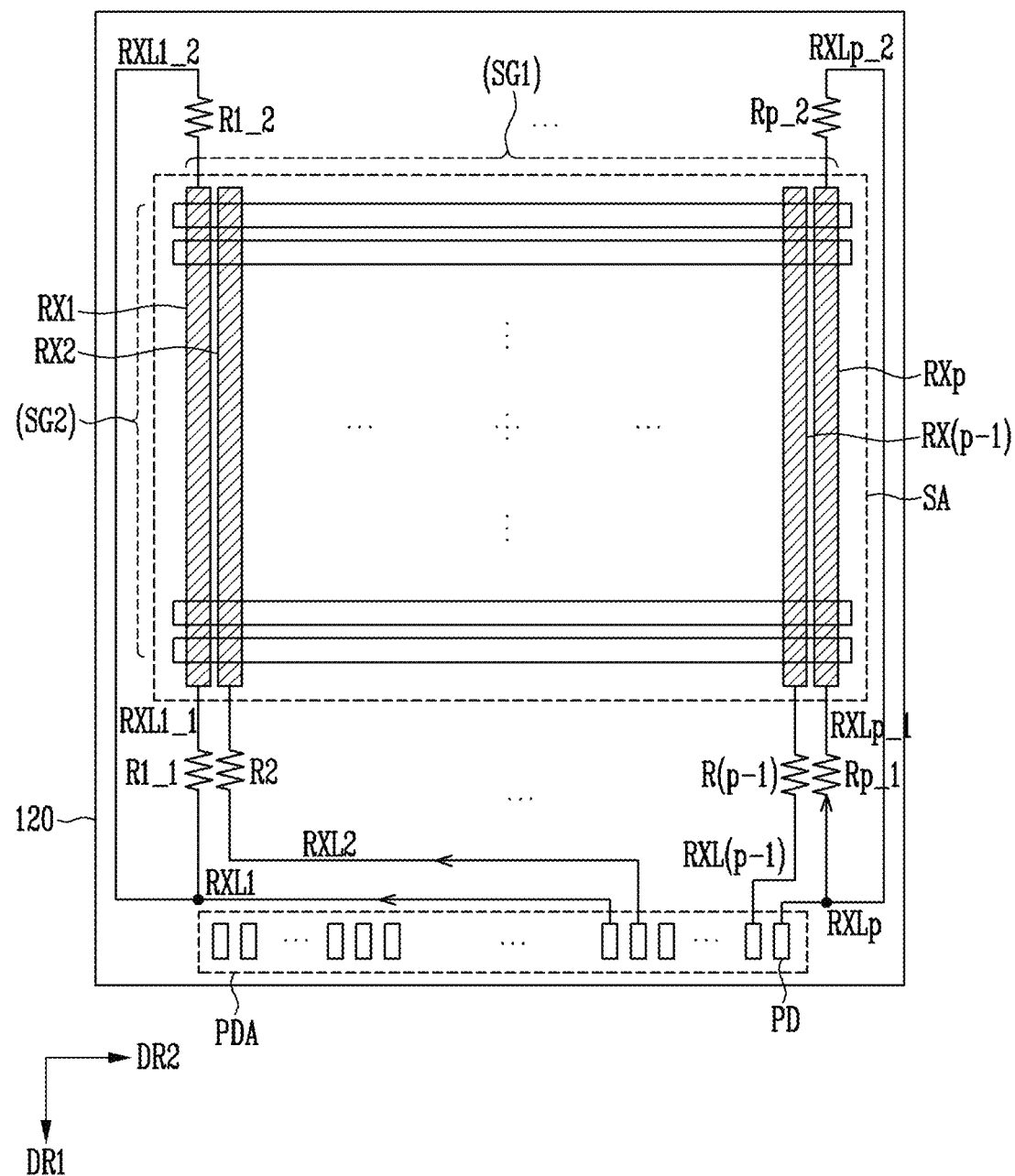
FIG. 10 is a block diagram illustrating routing lines of the signal lines connected to the sensor electrodes of the first sensor electrode group.

FIG. 10 is a block diagram for describing routing lines of the signal lines connected to the sensor electrodes of the first sensor electrode group.

Referring to FIGS. 8 and 10, in the sensor array 120, the first to p-th sensing lines RXL1 to RXLp connected to the first to p-th sensing electrodes RX1 to RXp of the first sensor electrode group SG1 may include different routing lines. Hereinafter, the routing lines of the sensing lines may be referred to as sensing routing lines.

In an embodiment, the first and p-th sensing lines RXL1 and RXLp may include the first sensing line RXL1 connected to the first sensing electrode RX1, and the p-th sensing line RXLp connected to the p-th sensing electrode RXp. The first and p-th sensing lines RXL1 and RXLp may include first sensing routing lines RXL1_1 and RXLp_1 connected to respective first ends of the first and p-th sensing electrodes RX1 and RXp, and second sensing routing lines RXL1_2 and RXLp_2 connected to respective second ends of the first and p-th sensing electrodes RX1 and RXp.

On the other hand, the second to p−1-th sensing lines RXL2 to RXL(p−1) may include single sensing routing lines connected to respective first ends of the second to p−1-th sensing electrodes RX2 to RX(p−1). Sensing routing lines may not be connected to respective second ends of the second to p−1-th sensing electrodes RX2 to RX(p−1).

The sensing routing lines connected to the first ends of the first to p-th sensing electrodes RX1 to RXp of the first sensor electrode group SG1 may be referred to as near routing lines adjacent to the plurality of pads PD. The sensing routing lines connected to the second ends of the first to p-th sensing electrodes RX1 to RXp may be referred to as far routing lines distant from the plurality of pads PD.

In the case where a specific type of protective film is used, capacitances formed on the first and p-th sensing electrodes RX1 and RXp adjacent to the edge of the sensor array 120 among the first sensor electrode group SG1, may be relatively high compared to capacitances formed on the remaining second to p−1-th sensing electrodes RX2 to RX(p−1). In accordance with an embodiment of the present disclosure, the first sensing line RXL1 may be connected to the first and second ends of the first sensing electrode RX1 through the first and second sensing routing lines RXL1_1 and RXL1_2, each of which include a resistor R1_1 or R1_2. The p-th sensing line RXLp may be connected to the first and second ends of the p-th sensing electrode RXp through the first and second sensing routing lines RXLp_1 and RXLp_2, each of which includes a resistor Rp_1 or Rp_2. On the other hand, the second to p−1-th sensing lines RXL2 to RXL(p−1) may be connected to the first ends of the second to p−1-th sensing electrodes RX2 to RX(p−1) through single sensing routing lines including the respective resistors R2 to R(p−1).

In an embodiment, capacitances formed on the first sensing electrode RX1 and the p-th sensing electrodes RXp may be relatively high compared to capacitances formed on the remaining sensing electrodes RX2 to RX(p−1). To compensate for this, each of the second to p−1-th sensing lines RXL2 to RXL(p−1) may be formed of a single sensing routing line connected to a corresponding one of the first ends of the second to p−1-th sensing electrodes RX2 to RX(p−1). On the other hand, each of the first and p-th sensing lines RXL1 and RXLp may be two sensing routing lines. For example, it can be understood that the two sensing routing lines are connected in parallel between any one of the pads PD and the corresponding sensing electrode. Since the first and p-th sensing lines RXL1 and RXLp each have two sensing routing lines connected in parallel, the effective resistance of the connection of pads PD to the first and p-th sensing lines RXL1 and RXLp may have a relatively low resistance value. The resistors R1_1 and R1_2 of the first sensing line RXL1 and the resistors Rp_1 and Rp_2 of the p-th sensing line RXLp may be set to provide an effective resistance lower than the resistances of the resistors R2 to R(p−1) of the second to p−1-th sensing lines RXL2 to RXL(p−1). In particular, by connection of the routing lines, the first sensing line RXL1 and the p-th sensing line RXLp may be implemented to have effective resistance values that are lower by a ratio difference in capacitance than the second to p−1-th sensing lines RXL2 to RXL(p−1). The ratio difference in capacitance may be calculated in the same manner as that described above with reference to FIGS. 8 and 9.

Figure 11:
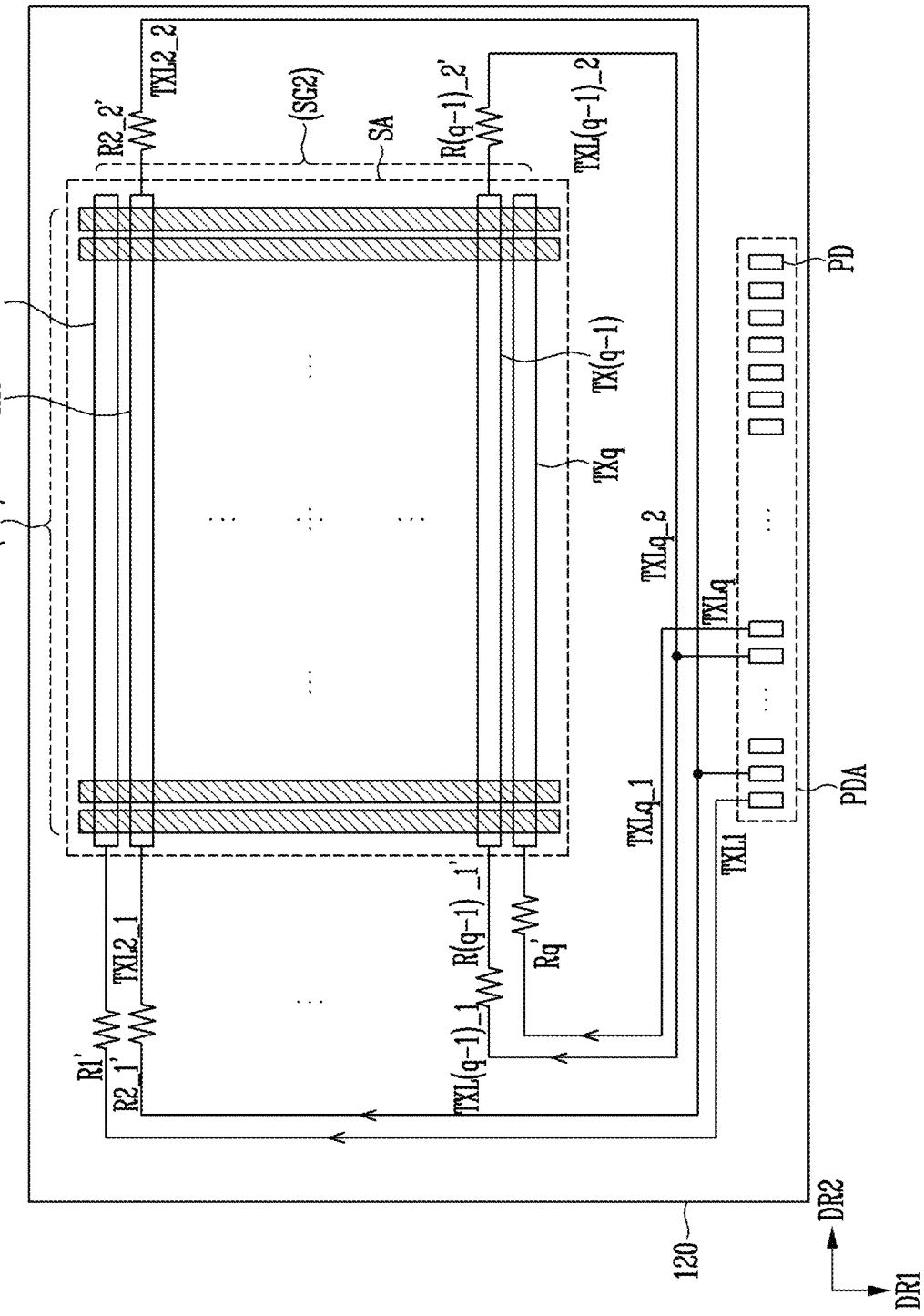
FIG. 11 is a block diagram illustrating routing lines of the signal lines connected to the sensor electrodes of the second sensor electrode group.

FIG. 11 is a block diagram showing routing lines of the signal lines connected to the sensor electrodes of the second sensor electrode group.

Referring to FIGS. 9 and 11, in the sensor array 120, the first to q-th driving lines TXL1 to TXLq connected to the first to q-th driving electrodes TX1 to TXq of the second sensor electrode group SG2 may include different routing lines. Hereinafter, the routing lines of the driving lines may be referred to as driving routing lines.

In an embodiment, the first to q-th driving lines TXL1 to TXLq may include the first driving line TXL1 connected to the first driving electrode TX1, and the q-th driving line TXLq connected to the q-th driving electrode TXq. The first and q-th driving lines TXL1 and TXLq may include single driving routing lines connected to the respective first ends of the first and q-th driving electrodes TX1 and TXq. Driving routing lines may not be connected to the respective second ends of the first and q-th driving electrodes TX1 and TXq.

On the other hand, the second to q−1-th driving lines TXL2 to TXL(q−1) may include first driving routing lines TXL2_1 to TXL(q−1)_1 connected to the respective first ends of the second to q−1-th driving electrodes TX2 to TX(q−1) and include second driving routing lines TXL2_2 to TXL(q−1)_2 connected to the respective second ends of the second to q−1-th driving electrodes TX2 to TX(q−1).

The driving routing lines connected to the first ends of the first to q-th driving electrodes TX1 to TXq of the second sensor electrode group SG2 may be referred to as near routing lines. The driving routing lines connected to the second ends of the first to q-th driving electrodes TX1 to TXq may be referred to as far routing lines.

In the case where a specific type of protective film is used, capacitances formed on the first and q-th driving electrode TX1 and TXq adjacent to the edge of the sensor array 120 among the second sensor electrode group SG2 may be relatively low compared to the second to q−1-th driving electrodes TX2 to TX(q−1). In an embodiment of the present disclosure, the first driving line TXL1 may be connected to the first end of the first driving electrode TX1 through a single driving routing line TXL1 including a resistor R1'. The q-th driving line TXLq may be connected to the first end of the q-th driving electrode TXq by a single driving routing line TXLq including a resistor Rq'. On the other hand, the remaining second to q−1-th driving lines TXL2 to TXL(q−1) may be connected to the respective first ends and second ends of the second to q−1-th driving electrodes TX2 to TX(q−1) by the first driving routing lines TXL2_1 to TXL(q−1)_1 including respective resistors R2_1' to R(q−1)_1' and the second riving routing lines TXL2_2 to TXL(q−1)_2 including respectively resistors R2_2' to R(q−1)_2'.

In an embodiment, capacitances formed on the first and q-th driving electrodes TX1 and TXq may be relatively low compared to capacitances formed on the second to q−1-th driving electrodes TX2 to TX(q−1). To compensate for this, each of the first and q-th driving lines TXL1 and TXLq may include a single driving routing line connected to the first end of a corresponding one the first and q-th driving electrodes TX1 and TXq. On the other hand, each of the second to q−1-h driving lines TXL2 to TXL(q−1) may be formed of two driving routing lines. The two driving routing lines are connected in parallel between any one of the pads PD and the corresponding driving electrode. Since the second to q−1-th driving lines TXL2 and TXL(q−1) are connected in parallel, each may have a relatively low resistance electrical connection to pads PD.

The resistor R1' of the first driving line TXL1 and the resistor Rq' of the q-th driving line TXLq may be set to have resistance values higher than the effective resistance of the second to q−1-th driving lines TXL2 to TXL(q−1). In particular, by connection of the routing lines, the first driving line TXL1 and the q-th driving line TXLq may be implemented to have resistance values that are higher by a ratio difference in capacitance than the second to q−1-th driving lines TXL2 to TXL(q−1). The ratio difference in capacitance may be calculated, as described above with reference to FIGS. 8 and 9.

Figure 12:
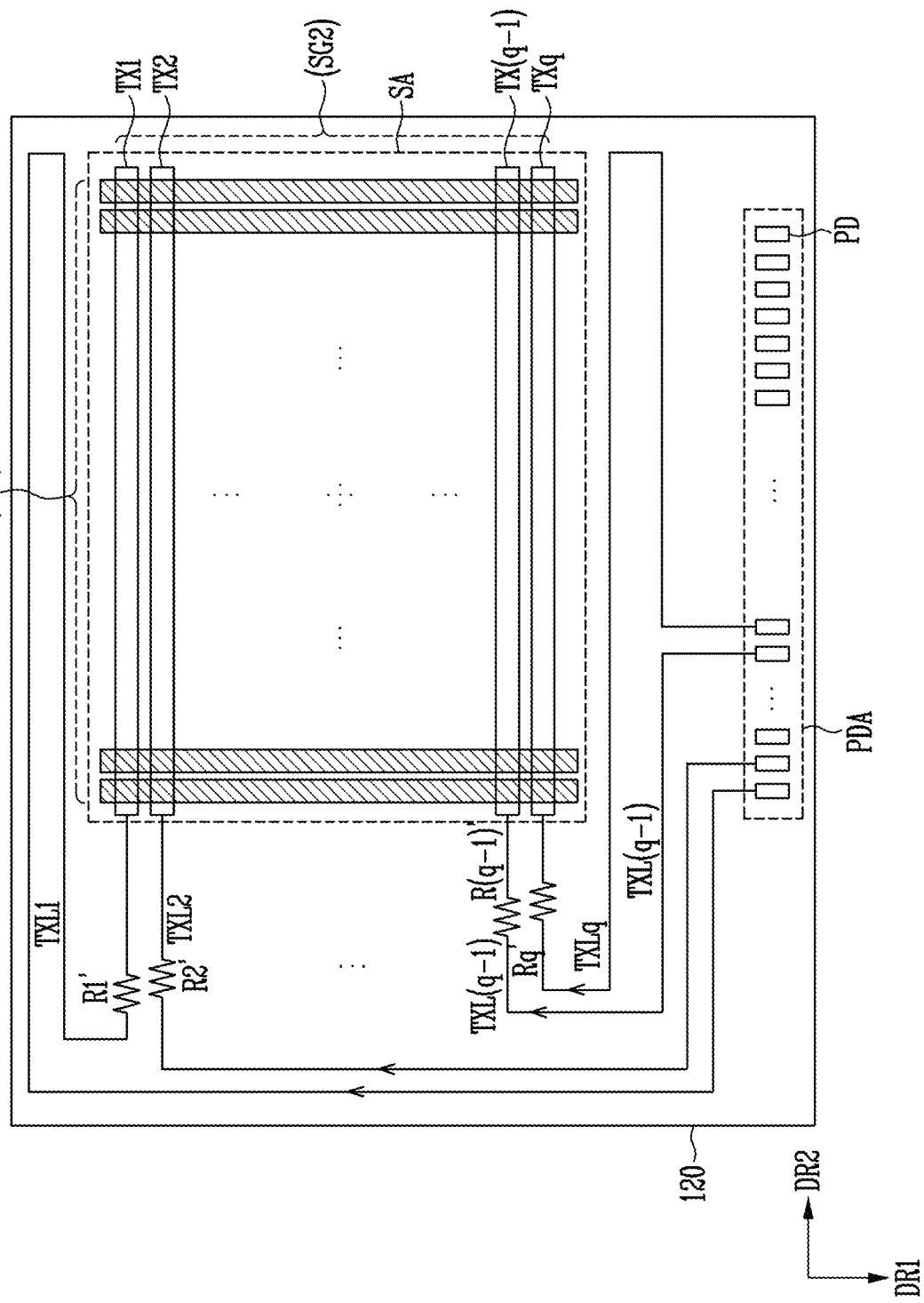
FIG. 12 is a block diagram illustrating an embodiment of signal lines connected to sensor electrodes adjacent to an edge of the second sensor electrode group.

FIG. 12 is a block diagram showing an embodiment of signal lines connected to sensor electrodes of the second sensor electrode group.

Referring to FIG. 12, the first driving line TXL1 may extend along the edge of the sensor array 120 in the second direction DR2 and a direction opposite to the second direction DR2 in a reciprocating manner making a connection to the first end of the first driving electrode TX1. Likewise, the q-th driving line TXLq may extend along the edge of the sensor array 120 in the second direction DR2 and a direction opposite to the second direction DR2 in a reciprocating manner making a connection to the first end of the q-th driving electrode TXq.

In the case where a specific type of protective film is used, capacitances formed on the first and q-th driving electrode TX1 and TXq, which are adjacent to the edge of the sensor array 120 among the second sensor electrode group SG2, may be relatively low compared to capacitances formed on the second to q−1-th driving electrodes TX2 to TX(q−1). Therefore, the first driving line TXL1 connecting the first driving electrode TX1 and the pad PD may have a first length. The second driving line TXL2 connecting the second driving electrode TX2 and the pad P-D may have a second length. Here, the first length of the first driving line TXL1 may be longer than the second length of the second driving line TXL2.

The longer lengths of the first and q-th driving lines TXL1 and TXLq may increase the resistance values of the respective resistance R1' and Rq' included in the first and q-th driving lines TXL1 and TXLq. On the other hand, the lengths of the second to q−1-th driving lines TXL2 to TXL(q−1) may be shorter than the lengths of the first and q-th driving lines TXL1 and TXLq. Therefore, the respective resistances R2' to R(q−1)' included in the second to q−1-th driving lines TXL2 to TXL(q−1) may be lower than the respective resistances R1 and Rq included in the first and q-th driving lines TXL1 and TXLq.

The lengths of signal lines may also similarly be used to compensate for differences in capacitances for sensing electrodes in the first group SG1. In the case where a specific type of protective film is used, capacitances formed on the first and p-th sensing electrodes RX1 and RXp, which are adjacent to the edge of the sensor array 120 among the first sensor electrode group SG1, may be relatively high compared to capacitances formed on the remaining second to p-1-th sensing electrodes RX2 to RX(p-1). To compensate, the first sensing line RXL1, which connects the first sensing electrode RX1 and its pad PD, may have a third length, and the second sensing line RXL2, which connects the second sensing electrode RX2 and its pad PD, may have a fourth length. Here, the third length of the first sensing line RXL1 may be shorter than the fourth length of the second sensing line RXL2.

For example, as the lengths of the first and p-th sensing lines RXL1 and RXLp decrease, the resistance values of the respective resistances R1 and Rp included in the first and p-th sensing lines RXL1 and RXLp may decrease. On the other hand, the lengths of the second to p-1-th sensing lines RXL2 to RXL (q-1) may be greater than the lengths of the first and p-th sensing lines RXL1 and RXLp. Therefore, the respective resistances R1 and Rp included in the first and p-th sensing lines RXL1 and RXLp may be lower than the respective resistances R2 to R(p-1) included in the second to p-1-th sensing lines RXL2 to RXL(p-1).

As such, since respective signal lines connected to the sensor electrodes of the sensor array 120 may have lengths proportional to the ratio differences in capacitance, a sensing device can compensate for differences in the capacitances of sensing electrodes and provide more uniform sensing response. As a result, deviations in capacitance formed in the sensor array 120 may be compensated for.

Various embodiments of the present disclosure may provide a display device and a sensor device capable of sensing touches with improved reliability.

The effects of the present disclosure are not limited by the foregoing, and other various effects are anticipated herein.

Although certain embodiments and implementations have been described herein, other embodiments and modifications will be apparent from the foregoing description. Accordingly, the concepts of the present disclosure are not limited to the foregoing embodiments, but rather to the broader scope of the presented claims.

What is claimed is:

1. A display device, comprising:
   a display panel;
   a sensor array provided to overlap the display panel, and comprising a first sensor electrode group including sensor electrodes extending in a first direction and arranged in a second direction at an angle with the first direction, and a second sensor electrode group including sensor electrodes extending in the second direction and arranged in the first direction;
   first signal lines electrically connected to the sensor electrodes of the first sensor electrode group;
   second signal lines electrically connected to the sensor electrodes of the second sensor electrode group; and
   a sensor driver connected to the sensor array through the first signal lines and the second signal lines to sense a touch adjacent to the sensor array,
   wherein the sensor electrodes of the first sensor electrode group comprise a first sensor electrode adjacent to an edge of the sensor array, and a second sensor electrode spaced apart from the edge of the sensor array with the first sensor electrode interposed therebetween,
   wherein a signal line connected to the first sensor electrode among the first signal lines includes a first routing line and a second routing line respectively connected to a first end and a second end of the first sensor electrode, wherein the signal line connected to the first sensor electrode has a resistance value lower than the signal line connected to the second sensor electrode wherein the resistance value is chosen to account for a protective film, and
   wherein a signal line connected to the second sensor electrode among the first signal lines includes a third routing line connected to a first end of the second sensor electrode without a routing line connected to a second end of the second sensor electrode.

2. The display device according to claim 1, wherein the signal line connected to the first sensor electrode has a capacitance higher than the signal line connected to the second sensor electrode.

3. The display device according to claim 1,
   wherein the sensor electrodes of the first sensor electrode group further comprise a third sensor electrode adjacent to the edge of the sensor array,
   wherein the second sensor electrode is disposed between the first sensor electrode and the third sensor electrode, and
   wherein a signal line connected to the third sensor electrode among the first signal lines includes a fourth routing line and a fifth routing line respectively connected to a first end and a second end of the third sensor electrode.

4. The display device according to claim 3,
   wherein the signal line connected to the first sensor electrode has a resistance value lower than the signal line connected to the second sensor electrode, and
   wherein the signal line connected to the third sensor electrode has a resistance value lower than the signal line connected to the second sensor electrode.

5. The display device according to claim 1,
   wherein each of the first signal lines includes at least one resistor, and
   wherein the at least one resistor of the signal line connected to the first sensor electrode has a resistance value lower than the at least one resistor of the signal line connected to the second sensor electrode.

6. The display device according to claim 1,
   wherein the sensor array further comprises a plurality of pads connected to the sensor electrodes of the first sensor electrode group through the first signal lines, and
   wherein the first signal lines include resistors disposed between the sensor electrodes of the first sensor electrode group and the plurality of pads.

7. The display device according to claim 1,
   wherein a signal line connected to the first sensor electrode among the first signal lines has a first length, and a signal line connected to the second sensor electrode among the first signal lines has a second length, and
   wherein the first length is less than the second length.

8. The display device according to claim 1,
   wherein the sensor electrodes of the second sensor electrode group comprise a fourth sensor electrode adjacent to the edge of the sensor array, and a fifth sensor electrode spaced apart from the edge of the sensor array with the fourth sensor electrode interposed therebetween, and
   wherein the signal line connected to the fourth sensor electrode has a capacitance lower than the signal line connected to the fifth sensor electrode.

9. The display device according to claim 1,
wherein the sensor electrodes of the second sensor electrode group comprises a fourth sensor electrode adjacent to the edge of the sensor array, and a fifth sensor electrode spaced apart from the edge of the sensor array with the fourth sensor electrode interposed therebetween, and
wherein a signal line connected to the fourth sensor electrode among the second signal lines has a resistance value higher than a signal line connected to the fifth sensor electrode among the second signal lines.

10. The display device according to claim 9,
wherein the sensor electrodes of the second sensor electrode group further comprise a sixth sensor electrode adjacent to the edge of the sensor array,
wherein the fifth sensor electrode is disposed between the fourth sensor electrode and the sixth sensor electrode, and
wherein a signal line connected to the sixth sensor electrode among the second signal lines has a resistance value higher than the signal line connected to the fifth sensor electrode among the second signal lines.

11. The display device according to claim 10, wherein signal lines respectively connected to the fourth sensor electrode and the sixth sensor electrode among the second signal lines extend in a reciprocating manner along the edge of the sensor array.

12. The display device according to claim 1, further comprising:
a window disposed on the sensor array; and
the protective film disposed on the window.

13. The display device according to claim 12, wherein the protective film includes an anti-static coating layer.

14. A sensor device comprising:
a sensor array provided to overlap a display panel, and comprising a first sensor electrode group including sensor electrodes extending in a first direction and arranged in a second direction at an angle with the first direction, and a second sensor electrode group including sensor electrodes extending in the second direction and arranged in the first direction;
first signal lines electrically connected to the sensor electrodes of the first sensor electrode group;
second signal lines electrically connected to the sensor electrodes of the second sensor electrode group; and
a sensor driver connected to the sensor array through the first signal lines and the second signal lines to sense a touch adjacent to the sensor array,
wherein the sensor electrodes of the first sensor electrode group comprise a first sensor electrode adjacent to an edge of the sensor array, and a second sensor electrode spaced apart from the edge of the sensor array with the first sensor electrode interposed therebetween,
wherein a signal line connected to the first sensor electrode among the first signal lines includes a first routing line and a second routing line respectively connected to a first end and a second end of the first sensor electrode, wherein the signal line connected to the first sensor electrode has a resistance value lower than the signal line connected to the second sensor electrode wherein the resistance value is chosen to account for a protective film, and
wherein a signal line connected to the second sensor electrode among the first signal lines includes a third routing line connected to a first end of the second sensor electrode without a routing line connected to a second end of the second sensor electrode.

* * * * *